United States Patent
Bögge

[11] Patent Number: 5,992,879
[45] Date of Patent: Nov. 30, 1999

[54] VEHICLE CHILD SEAT ARRANGEMENT WITH SELECTIVELY ACTIVATED AIRBAG

[75] Inventor: Herbert Bögge, Wiernsheim, Germany

[73] Assignee: Dr. Ing. h.c.F. Porsche AG, Weissach, Germany

[21] Appl. No.: 08/803,384

[22] Filed: Feb. 20, 1997

[30] Foreign Application Priority Data

Feb. 20, 1996 [DE] Germany .......................... 196 06 140
Jul. 17, 1996 [DE] Germany .......................... 196 28 763

[51] Int. Cl.⁶ ................................................. B60R 21/32
[52] U.S. Cl. ............................................ 280/735; 280/734
[58] Field of Search ................................. 280/734, 735; 297/216.1; 180/273

[56] References Cited

U.S. PATENT DOCUMENTS 5,468,014  11/1995  Gimbel et al. ........................... 280/735
5,605,348   2/1997  Blackburn et al. ...................... 280/735

FOREIGN PATENT DOCUMENTS

4243826A1  6/1994  Germany .
4327341    2/1995  Germany ............................... 280/734
4426677    2/1995  Germany ............................... 280/735

Primary Examiner—Eric Culbreth
Attorney, Agent, or Firm—Evenson, McKeown, Edwards & Lenahan, P.L.L.C.

[57] ABSTRACT

A motor vehicle includes at least one vehicle seat to which a child seat mounted thereon can be fastened, with a device being provided for deactivating an airbag located in front of the seat when the child seat is mounted. In order for such a device to be capable of being retrofitted simply and economically even in existing standard vehicles, the device is composed of an additional tongue mounted on the child seat and a buckle that is actively connected with a central triggering unit, so that the airbag is deactivated when the tongue is inserted into the buckle and said airbag is reactivated when the tongue and buckle connection is broken.

18 Claims, 3 Drawing Sheets

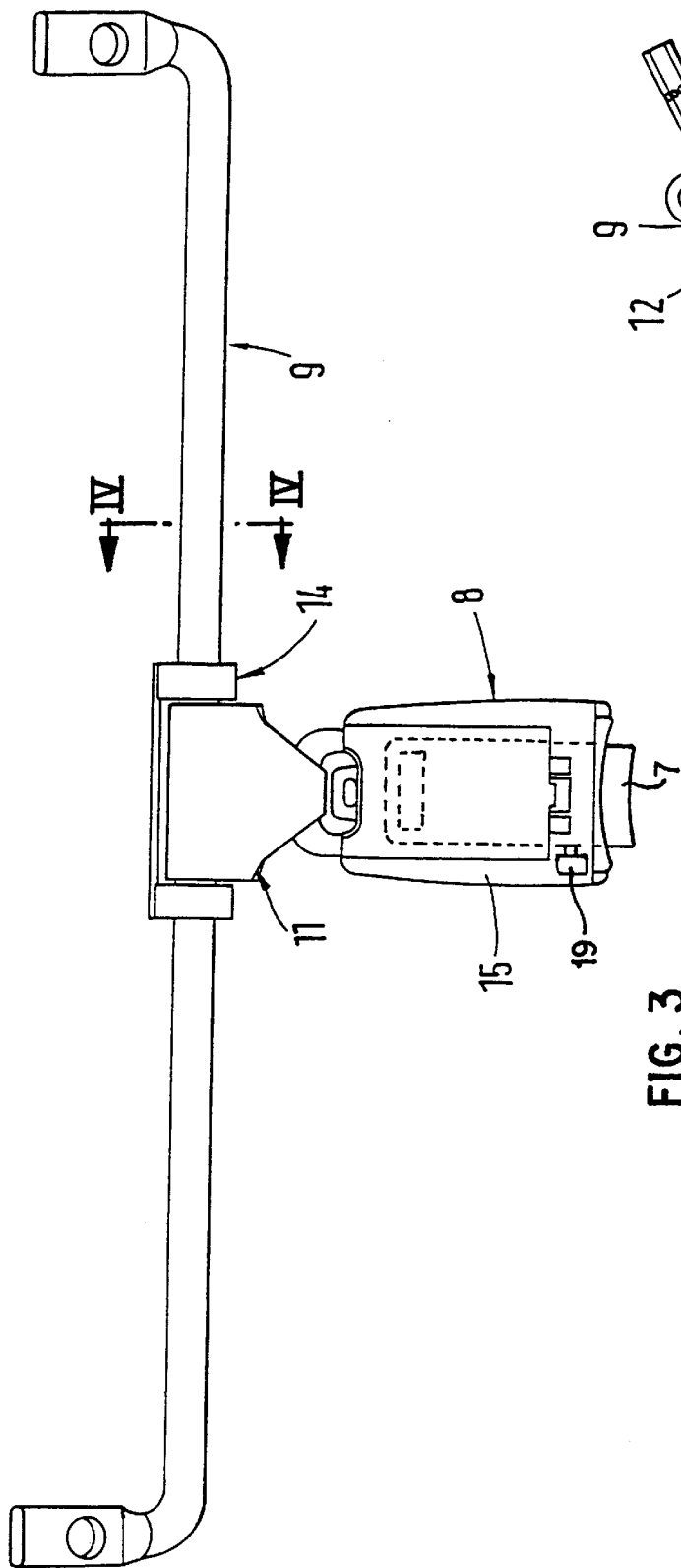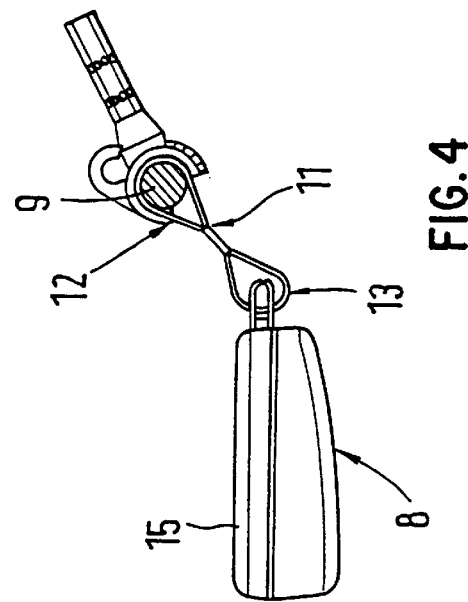

VEHICLE CHILD SEAT ARRANGEMENT WITH SELECTIVELY ACTIVATED AIRBAG

CROSS-REFERENCE TO RELATED APPLICATIONS

This application is related to U.S. patent application Ser. No. 08/895,902, filed on Jul. 17, 1997, for an APPARATUS AND METHOD FOR DEACTIVATING AN AIRBAG, which is a continuation-in-part of the instant application.

BACKGROUND AND SUMMARY OF THE INVENTION

The invention relates to a motor vehicle with at least one vehicle seat on which a child seat can be fastened, including a device for deactivating an airbag located in front of the vehicle seat when occupied by the child seat.

This application claims the priority of German patent application 196 06 140.7 filed on Feb. 20, 1996, and German patent application 196 28 763.4 filed on Jul. 17, 1996, the disclosures of which are expressly incorporated by reference herein.

In a system of the general type referred to above and described in German patent document DE 42 43 826 A1, the vehicle seat has seat belt buckles located on both sides of the seat cushion in the area between the seat back fittings and the seat back, into which buckles matching catches of a child seat can be inserted. The buckles are therefore provided with a sensor that reacts to the fastening of the child seat to deactivate the airbag. With this system the corresponding airbag is therefore deactivated at the same time as the child seat is attached to the vehicle seat.

This system suffers from the disadvantage that retrofitting is only feasible with difficulty at affordable expense in existing standard vehicles, since special fittings such as catches, seat belt buckles or the like must be provided on the child seat as well as on the vehicle seat.

An object of the invention is to provide a device for deactivating an airbag located in front in a vehicle with at least one vehicle seat and a child seat placed thereon, said device being capable of being retrofitted simply and economically even in existing standard vehicles.

This goal is achieved according to the invention by providing an arrangement wherein an additional tongue and interengageable buckle carried by the child seat and vehicle are provided for triggering control of an airbag actuating circuit such that the airbag is deactivated when the tongue is inserted in the buckle and the airbag is reactivated when the tongue is not engaged in the buckle.

In especially preferred embodiments the tongue is carried by the child seat and the buckle is on a strap connected to the vehicle seat/vehicle.

Primary advantages achieved with the invention consist in the fact that the device, composed of an additional tongue on the child seat and a buckle that is in active communication with the central triggering unit, has a simple design to deactivate the airbag and can be retrofitted at low expense in standard vehicles.

The airbag is not deactivated until the tongue is inserted manually into the buckle, and it is reactivated when the tongue and buckle are disconnected. In preferred embodiments, the additional tongue and buckle connection does not serve to secure the child seat to the vehicle seat. In preferred embodiments, the tongue and buckle for deactivating the airbag have dimensions different from those of the tongue and buckle of the seat belt system for the vehicle seat, so that improper connections are prevented.

Other objects, advantages and novel features of the present invention will become apparent from the following detailed description of the invention when considered in conjunction with the accompanying drawings.

BRIEF DESCRIPTION OF THE DRAWINGS

FIG. 3 is a partial top view showing the transversely extending cross member with the buckle of the arrangement of FIGS. 1 and 2; and FIG. 4 is a sectional view along line IV—IV in FIG. 3.

DETAILED DESCRIPTION OF THE DRAWINGS

Figure 1:
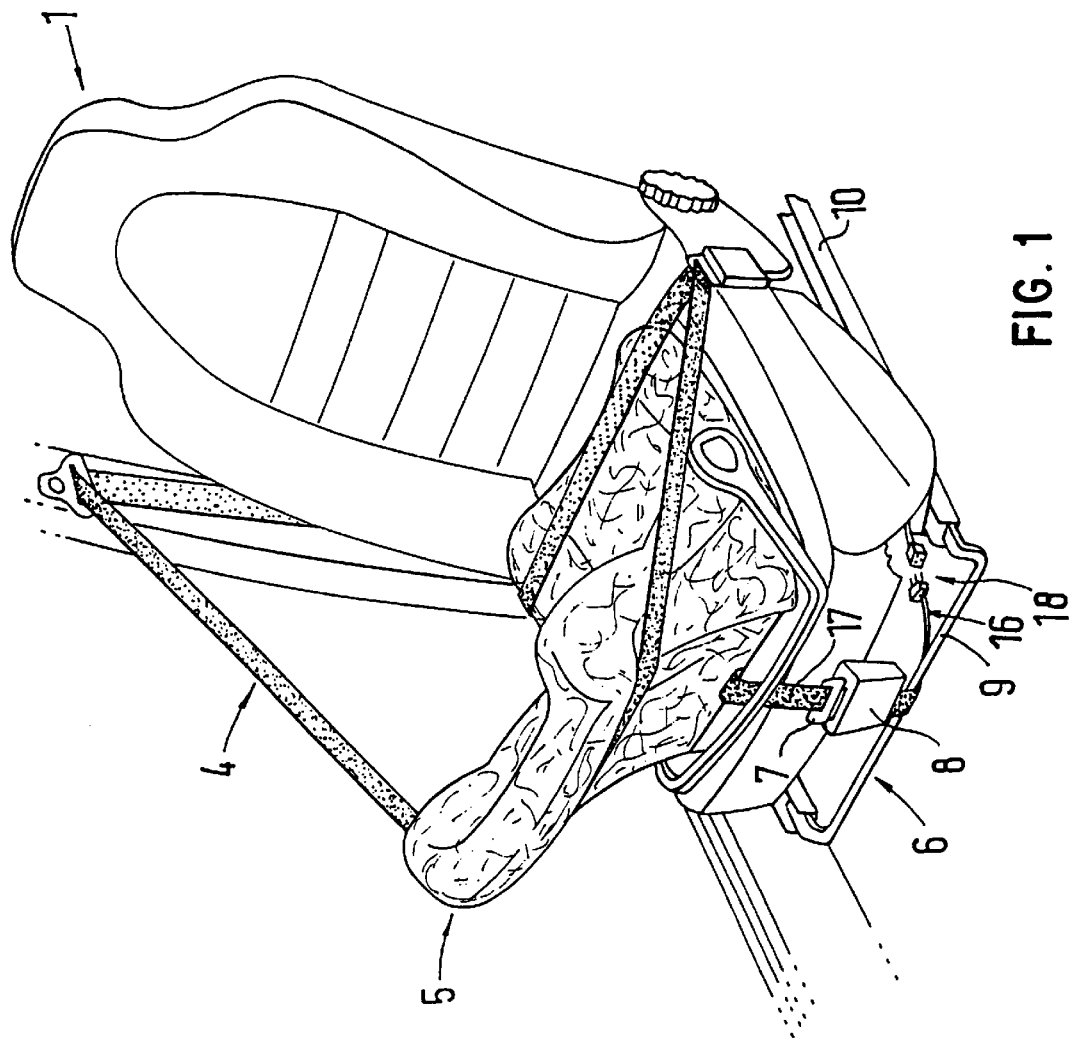
FIG. 1 is a perspective view, diagonally from the front, of a child seat resting on the seat cushion of a motor vehicle seat and facing backward, including an arrangement according to a preferred embodiment of the invention.

The motor vehicle, not shown in greater detail in the figures, has at least one vehicle seat with a child seat fastenable thereon. Child seat 2 placed on seat part 3 of vehicle seat 1 is secured by a conventional three-point seat belt 4 which, when child seat 2 is removed, serves to secure a vehicle occupant sitting in the vehicle seat. Child seat 2 can be arranged so that it faces in the direction of travel, not shown in greater detail, or opposite the direction of travel.

Child seat 2 is provided with its own seat belt harness system or impact cushion (not shown in greater detail) to secure a child.

To prevent the airbag located in front from striking child seat 1 when it opens in a vehicle collision, thus possibly causing severe injury to the child, a device 6 is provided for deactivating the not shown airbag when child seat 2 is mounted.

Device 6 comprises an additional seat belt tongue 7 mounted on child seat 2 and a seat belt buckle 8 that is actively connected with a central triggering unit, not shown, for the airbags, with manual insertion of tongue 7 into buckle 8 deactivating the airbag and with the airbag being reactivated when the tongue and buckle are separated. Buckle 8 is mounted on a cross member 9 that runs transversely in front of vehicle seat 1, as viewed in the direction of travel. Cross member 9, which is approximately U-shaped in a top view, is releasably mounted at its two ends, running lengthwise, to the corresponding seat runners 10. This is accomplished by using bolts as depicted schematically in FIG. 2 for example.

Buckle 8 extends in a central area of the transverse extent of cross member 9 that has a circular cross section, with a short belt section 11 running between cross member 9 and buckle 8. The portion of cross member 9 that extends transversely lies close to the floor of the vehicle.

In the embodiment shown, a first loop-shaped end area 12 of seat belt section 11 runs around cross member 9 that runs transversely, with a second loop-shaped end area 13 being connected with buckle 8 (FIG. 4).

The loop-shaped end area 12 that runs around cross member 9 is secured against shifting laterally by a stop 14 clipped onto it. Buckle 8 has, inside housing 15, a conventional switch schematically shown at 19 which is connected by a connecting lead 16 to the central triggering unit. The central triggering unit is reprogrammed by a qualified service center or garage when a child seat 2 is used.

The additional tongue 7 is located in a central area of the transverse portion of child seat 2, with a seat belt section 17 running between tongue 7 and child seat 2.

Tongue 7 and buckle 8 for deactivating the airbag have dimensions different from those of the tongue and buckle of seat belt 4 for vehicle seat 1 in order to prevent improper operation.

Figure 2:
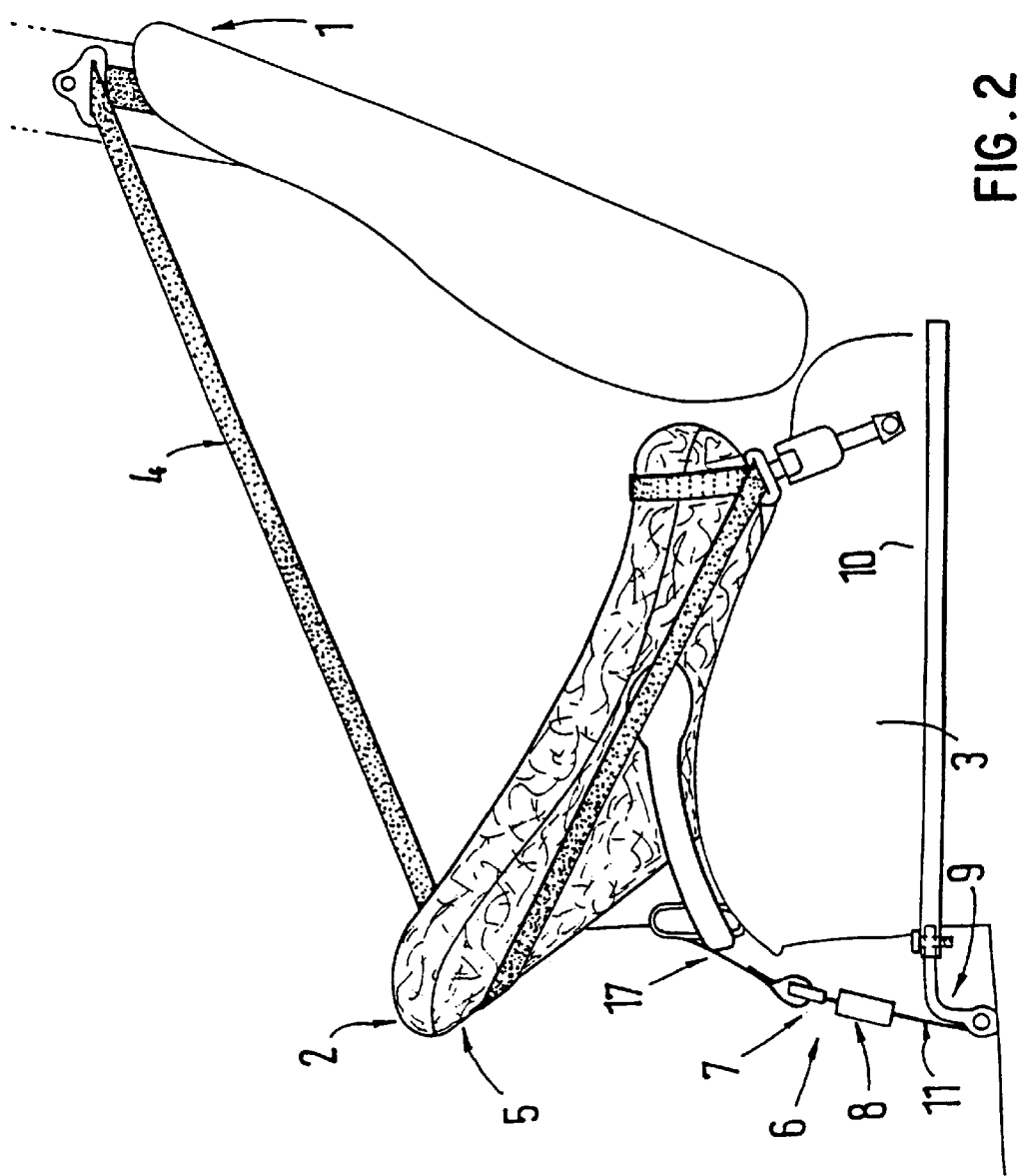
FIG. 2 is a side view of the vehicle seat of FIG. 1 with the child seat resting thereon.

In FIGS. 1 and 2, the additional tongue 7 of child seat 2 has been inserted into the corresponding buckle 8, thus deactivating the airbag.

In FIG. 1 the tongue and buckle connection 18 of connecting lead 16 that leads to the central triggering unit is shown in the disconnected position; in the active position the two parts of tongue and buckle connection 18 are connected together.

According to FIG. 1, a passenger seat is shown with a child seat resting on it and facing backward. In this arrangement, device 6 serves to deactivate the passenger airbag. Device 6 however could be associated with a rear vehicle seat in which the associated airbag is located on the back of the front seat. In addition, the child seat can be placed so that it is parallel to the vehicle seat, in other words facing forward on the vehicle seat.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle with at least one vehicle seat to which a child seat placed on said seat can be fastened, with a device being provided for deactivating an airbag located in front of the seat when the child seat is mounted, said child seat being secured to said vehicle seat via an adult seat belt system, wherein said device is formed by an additionally provided tongue on the child seat and a buckle actively connected with a central triggering unit, said buckle being mounted on a cross member that extends transversely in front of the vehicle seat, with the airbag ahead of the child seat being deactivated when the tongue is inserted into the buckle and being reactivated when the tongue and buckle connection is broken.

2. Motor vehicle according to claim 1, wherein the buckle comprises a switch connected by a connecting lead to the central triggering unit.

3. Motor vehicle according to claim 1, wherein the additional tongue and the buckle of the child seat have dimensions different from those of tongues and buckles of the adult seat belt system.

4. Motor vehicle according to claim 1, wherein the central triggering unit is configured to be reprogrammed when a child seat is used.

5. Motor vehicle with at least one vehicle seat to which a child seat placed on said seat can be fastened, with a device being provided for deactivating an airbag located in front of the seat when the child seat is mounted, wherein said device is formed by an additionally provided tongue on the child seat and a buckle actively connected with a central triggering unit, with the airbag ahead of the child seat being deactivated when the tongue is inserted into the buckle and being reactivated when the tongue and buckle connection is broken, wherein the buckle is mounted on a cross member that extends transversely in front of the vehicle seat as viewed in the direction of travel, with the cross member having two ends which are bolted to corresponding seat runners.

6. Motor vehicle according to claim 5, wherein the buckle is located in a central area of a transverse portion of the cross member, with a seat belt section extending between the buckle and the cross member being secured against lateral shifting in a transverse direction by a stop mounted on the cross member.

7. Motor vehicle according to claim 6, wherein the buckle comprises a switch connected by a connecting lead to the central triggering unit.

8. Vehicle seat assembly comprising:

an adult passenger seat, an adult seat belt restraint system for restraining an adult in said passenger seat;

a selectively usable child seat mountable on said passenger seat, said child seat being secured with said adult seat belt restraint system when mounted on said passenger seat;

a first detent member carried by said child seat, and a second detent member connectable with an airbag actuation circuit, said second detent member being mounted on a cross member that extends transversely in front of the adult passenger seat, wherein said first and second detent members are configured to be manually interengaged when said child seat is mounted on said passenger seat to thereby deactivate the airbag actuation circuit, and wherein said first and second detent members are separate from said adult seat and said adult seat belt restraint system.

9. Vehicle seat assembly according to claim 8, wherein one of said detent members is a tongue and the other of said detent members is a buckle with an opening for insertion of said tongue.

10. Vehicle seat assembly according to claim 9, wherein at least one of said detent members is connected to a flexible strap.

11. Vehicle seat assembly according to claim 10, wherein both of said detent members are connected to respective flexible straps.

12. Vehicle seat assembly according to claim 9, wherein said tongue is fixed to the child seat.

13. Vehicle seat assembly according to claim 8, wherein at least one of said detent members is connected to a flexible strap.

14. Vehicle seat assembly according to claim 13, wherein both of said detent members are connected to respective flexible straps.

15. A child seat assembly which is selectively usable with a vehicle having an adult passenger seat, an adult passenger safety belt restraint system, and an airbag triggering circuit controlling an airbag disposed in front of the adult passenger seat, said child seat assembly comprising:

a selectably usable child seat mountable on said passenger seat, said child seat being secured with said adult passenger safety belt restraint system when mounted on said adult passenger seat, a first detent member connected to the child seat, and a second detent member detachably connectable with the airbag triggering circuit, said second detent member being mounted on a cross member that extends transversely in front of the adult passenger seat, wherein said first and second detent members are configured to be manually interengaged when said child seat is mounted on said passenger seat to thereby deactivate the airbag actuation circuit, and wherein said first and second detent members are separate from said adult seat and said adult passenger safety belt restraint system.

16. A child seat assembly according to claim 15, wherein said cross member is attachable by threaded members to a support structure for said adult passenger seat, said cross member controllably guiding a flexible strap member carrying said second detent member.

17. A child seat assembly according to claim 15, wherein one of said detent members is a tongue and the other of said detent members is a buckle with an opening for insertion of said tongue.

18. A child seat assembly according to claim 16, wherein one of said detent members is a tongue and the other of said detent members is a buckle with an opening for insertion of said tongue.

* * * * *